United States Patent
Zhou

(10) Patent No.: US 11,390,763 B2
(45) Date of Patent: Jul. 19, 2022

(54) INK COMPOSITION AND METHOD FOR PREPARING INK COMPOSITION

(71) Applicant: Pei Zhou, Yueyang (CN)

(72) Inventor: Pei Zhou, Yueyang (CN)

( * ) Notice: Subject to any disclaimer, the term of this patent is extended or adjusted under 35 U.S.C. 154(b) by 411 days.

(21) Appl. No.: 16/724,147

(22) Filed: Dec. 20, 2019

(65) Prior Publication Data

US 2021/0189159 A1    Jun. 24, 2021

(51) Int. Cl.

| | | |
|---|---|---|
| *C09D 11/16* | (2014.01) |
| *C08K 3/08* | (2006.01) |
| *C08K 5/521* | (2006.01) |
| *B01F 23/232* | (2022.01) |
| *B01F 23/23* | (2022.01) |
| *C08L 83/04* | (2006.01) |
| *C08L 33/10* | (2006.01) |
| *C08L 33/08* | (2006.01) |

(52) U.S. Cl.
CPC ............ *C09D 11/16* (2013.01); *B01F 23/232* (2022.01); *B01F 23/2319* (2022.01); *C08K 3/08* (2013.01); *C08K 5/521* (2013.01); *C08K 2003/0856* (2013.01); *C08L 33/08* (2013.01); *C08L 33/10* (2013.01); *C08L 83/04* (2013.01)

(58) Field of Classification Search
CPC ...... B01F 23/2319; B01F 23/232; C08K 3/08; C08K 5/521; C08K 2003/0856; C08L 33/08; C08L 33/10; C08L 83/04; C09D 11/16; C09D 5/06
See application file for complete search history.

*Primary Examiner* — Robert S Jones, Jr.
(74) *Attorney, Agent, or Firm* — Georgi Korobanov

(57) ABSTRACT

The present disclosure provides an ink composition and a method for preparing an ink composition. The ink composition includes following compositions in parts by weight salt solution in an amount ranging from 500-1000 parts; iron filings in an amount ranging from 20-30 parts; hydrogen chloride in an amount ranging from 2-5 parts; deionized water in an amount ranging from 40-50 parts; monoglyceride stearate in an amount ranging from 1-2 parts; monolauryl phosphate and polydimethylsiloxane in an amount ranging from 5-10 parts; methacrylate in an amount ranging from 5-10 parts; thermoplastic acrylic resin in an amount ranging from 5-10 parts; sodium dioctyl succinate sulfonate in an amount ranging from 2-5 parts; sodium dodecyl benzene sulfonate in an amount ranging from 2-5 parts; polyoxyethylene octyl phenol ether in an amount ranging from 3-8 parts; and isobutyl p-hydroxybenzoate in an amount ranging from 0.5-1 parts.

4 Claims, 1 Drawing Sheet

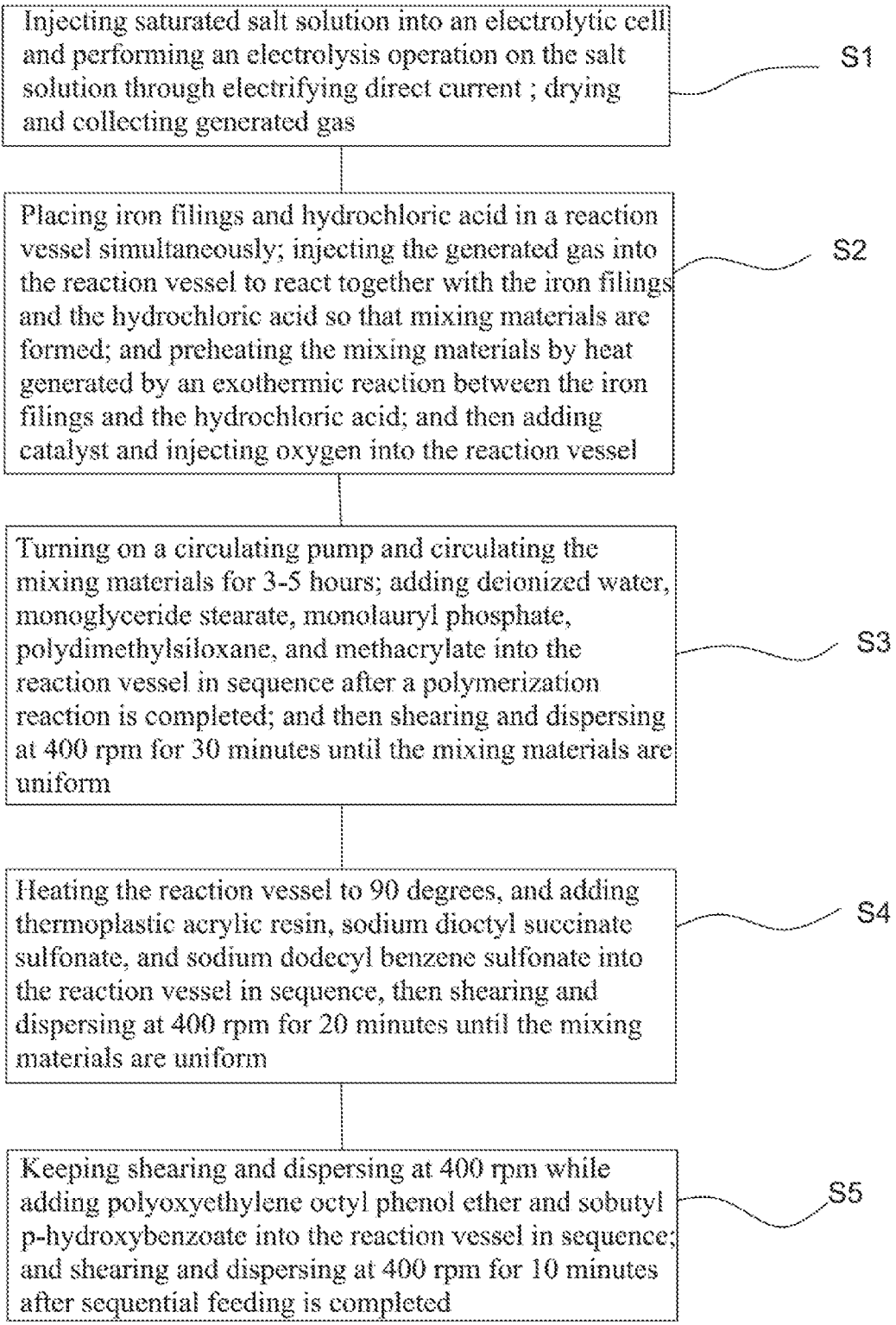

INK COMPOSITION AND METHOD FOR PREPARING INK COMPOSITION

TECHNICAL FIELD

The invention relates to a technical field of painting ink, in particular to an ink composition for handicraft painting and a method for preparing an ink composition.

BACKGROUND

Ink is one of the four treasures of the study in ancient times, and is favored by scholars and writers, and its importance is self-evident. The ink, as an important raw material of paint, good ink brings unexpected effects to paintings. The ink in the market often has an imbalance between the ink and water, resulting in lighter handwriting, and it is easy to degenerate over time. Further, a conventional complex pyrographic tool set is composed of hundreds of different shapes of soldering iron, which is not only easy to cause burns, but also expensive. Based on the above series of problems, following technical solutions are carried out.

SUMMARY

An object of the present disclosure is to provide an ink composition for handicraft painting and a preparing method for the ink composition. The ink composition produced by the method is used in the handicraft painting, and the painting is resistant to water, sunlight and ultraviolet rays, so that a permanent preservation effect of the handicraft is achieved To achieve the above objective, the present disclosure provides following technical solutions:

The present disclosure provides an ink composition for handicraft painting. And the ink composition includes following compositions in parts by weight salt solution in an amount ranging from 500-1000 parts, iron filings in an amount ranging from 20-30 parts, hydrogen chloride in an amount ranging from 2-5 parts, deionized water in an amount ranging from 40-50 parts, monoglyceride stearate in an amount ranging from 1-2 parts, monolauryl phosphate in an amount ranging from 5-10 parts, polydimethylsiloxane in an amount ranging from 5-10 parts, methacrylate in an amount ranging from 5-10 parts, thermoplastic acrylic resin in an amount ranging from 5-10 parts, sodium dioctyl succinate sulfonate in an amount ranging from 2-5 parts, sodium dodecyl benzene sulfonate in an amount ranging from 2-5 parts, polyoxyethylene octyl phenol ether in an amount ranging from 3-8 parts, and isobutyl p-hydroxybenzoate in an amount ranging from 0.5-1 parts.

Furthermore, the ink includes the following compositions in parts by weight: the salt solution in an amount of 500 parts, the iron filings in an amount of 20 parts, the hydrogen chloride in an amount of 2 parts, the deionized water in an amount of 40 parts, the monoglyceride stearate in an amount of 1 part, the monolauryl phosphate in an amount of 5 parts, the polydimethylsiloxane in an amount of 5 parts, the, methacrylate in an amount of 5 parts, the thermoplastic acrylic resin in an amount of 5 parts, the sodium dioctyl succinate sulfonate in an amount of 2 parts, the sodium dodecyl benzene sulfonate in an amount of 2 parts, the polyoxyethylene octyl phenol ether in an amount of 3 parts, and the isobutyl p-hydroxybenzoate in an amount of 0.5 parts.

Furthermore, the ink composition includes the following compositions in parts by weight: the salt solution in an amount of 700 parts, the iron filings in an amount of 25 parts, the hydrogen chloride in an amount of 3.5 parts, the deionized water in an amount of 45 parts, the monoglyceride stearate in an amount of 1.5 part, the monolauryl phosphate in an amount of 7.5 parts, the polydimethylsiloxane in an amount of 7.5 parts, the, methacrylate in an amount of 7.5 parts, the thermoplastic acrylic resin in an amount of 7.5 parts, the sodium dioctyl succinate sulfonate in an amount of 3.5 parts, the sodium dodecyl benzene sulfonate in an amount of 3.5 parts, the polyoxyethylene octyl phenol ether in an amount of 5.5 parts, and the isobutyl p-hydroxybenzoate in an amount of 0.75 parts.

Furthermore, the ink composition includes the following compositions in parts by weight: the salt solution in an amount of 1000 parts, the iron filings in an amount of 30 parts, the hydrogen chloride in an amount of 5 parts, the deionized water in an amount of 50 parts, the monoglyceride stearate in an amount of 2 parts, the monolauryl phosphate in an amount of 10 parts, the polydimethylsiloxane in an amount of 10 parts, the methacrylate in an amount of 10 parts, the thermoplastic acrylic resin in an amount of 10 parts, the sodium dioctyl succinate sulfonate in an amount of 5 parts, the sodium dodecyl benzene sulfonate in an amount of 5 parts, the polyoxyethylene octyl phenol ether in an amount of 8 parts, and the isobutyl p-hydroxybenzoate in an amount of 1 part.

The present disclosure provides a method for preparing the ink composition. The method further includes following steps:

step 1: injecting saturated salt solution into an electrolytic cell and performing an electrolysis operation on the salt solution through electrifying direct current (DC); drying and collecting generated gas;

step 2: placing iron filings and hydrochloric acid in a reaction vessel simultaneously; injecting the generated gas into the reaction vessel to react together with the iron filings and the hydrochloric acid so that mixing materials are formed; and preheating the mixing materials by heat generated by an exothermic reaction between the iron filings and the hydrochloric acid; and then adding catalyst and injecting oxygen into the reaction vessel;

step 3: turning on a circulating pump and circulating the mixing material for 3-5 hours; adding deionized water, monoglyceride stearate, monolauryl phosphate, polydimethylsiloxane, and methacrylate into the reaction vessel in sequence after a polymerization reaction is completed; and then shearing and dispersing at 400 rpm for 30 minutes until the mixing material is uniform;

step 4: heating the reaction vessel to 90 degrees, and adding thermoplastic acrylic resin, sodium dioctyl succinate sulfonate, and sodium dodecyl benzene sulfonate into the reaction vessel in sequence, then shearing and dispersing at 400 rpm for 20 minutes until the mixing material is uniform; and step 5: keeping shearing and dispersing at 400 rpm while adding polyoxyethylene octyl phenol ether and sobutyl p-hydroxybenzoate into the reaction vessel in sequence; and shearing and dispersing at 400 rpm for 10 minutes after sequential feeding is completed After paintings on wooden or bamboo products by the ink composition of the present disclosure, a hot air gun is used to blow the painting on the wooden or bamboo products for 1-2 minutes to fix the painting on a substrate. The painting is resistant to water, sunlight and ultraviolet rays, so that a permanent preservation effect of the handicraft is achieved. The ink composition of the present disclosure is able to replace pyrographic tools, which not only has low cost, but also makes the pyrographic simple, such that inspirations of an artist are easily realized.

BRIEF DESCRIPTION OF DRAWINGS

In order to more clearly explain embodiments of the present disclosure or technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained based on these drawings without paying creative labor.

The FIGURE is a schematic diagram of a preparation process of a method for preparing an ink composition of the present disclosure.

DETAILED DESCRIPTION

In order to make the purpose, technical solutions and advantages of the present disclosure clearer, the technical solutions of the present disclosure will be described in detail below. Obviously, the embodiments described are only a part of the present disclosure and not all of the embodiments. Based on the embodiments of the present disclosure, all other implementations obtained by a person of ordinary skill in the art without making creative efforts are within the scope of the present disclosure.

The invention provides an ink composition for handcraft painting and a method for preparing an ink composition. The following is a more detailed description of the technical solution for the present disclosure in combination with the FIGURE.

As shown in the FIGURE, in order to solve a problem of handicrafts (such as wooden products, bamboo products, etc.) that it is easy to cause decolorization after painting, and it being difficult to achieve permanent preservation of the handicrafts, the present disclosure provides an ink composition for handcraft painting and a method for preparing the ink composition.

The present disclosure provides the ink composition for handcraft painting. And the ink composition includes following compositions in parts by weight salt solution in an amount ranging from 500-1000 parts, iron filings in an amount ranging from 20-30 parts, hydrogen chloride in an amount ranging from 2-5 parts, deionized water in an amount ranging from 40-50 parts, monoglyceride stearate in an amount ranging from 1-2 parts, monolauryl phosphate in an amount ranging from 5-10 parts, polydimethylsiloxane in an amount ranging from 5-10 parts, methacrylate in an amount ranging from 5-10 parts, thermoplastic acrylic resin in an amount ranging from 5-10 parts, sodium dioctyl succinate sulfonate in an amount ranging from 2-5 parts, sodium dodecyl benzene sulfonate in an amount ranging from 2-5 parts, polyoxyethylene octyl phenol ether in an amount ranging from 3-8 parts, and isobutyl p-hydroxybenzoate in an amount ranging from 0.5-1 parts.

The present disclosure provides the method for preparing the ink composition. The method includes following steps:

Step 1: injecting saturated salt solution into an electrolytic cell and performing an electrolysis operation on the salt solution through electrifying direct current (DC); drying and collecting generated gas;

Step 2: placing iron filings and hydrochloric acid in a reaction vessel simultaneously; injecting the generated gas into the reaction vessel to react together with the iron filings and the hydrochloric acid so that mixing materials are formed; and preheating the mixing materials by heat generated by an exothermic reaction between the iron filings and the hydrochloric acid; and then adding catalyst and injecting oxygen into the reaction vessel;

Step 3: turning on a circulating pump and circulating the mixing materials for 3-5 hours; adding deionized water, monoglyceride stearate, monolauryl phosphate, polydimethylsiloxane, and methacrylate into the reaction vessel in sequence after a polymerization reaction is completed; and then shearing and dispersing at 400 rpm for 30 minutes until the mixing materials are uniform;

Step 4: heating the reaction vessel to 90 degrees, and adding thermoplastic acrylic resin, sodium dioctyl succinate sulfonate, and sodium dodecyl benzene sulfonate into the reaction vessel in sequence, then shearing and dispersing at 400 rpm for 20 minutes until the mixing material are uniform; and Step 5: keeping shearing and dispersing at 400 rpm while adding polyoxyethylene octyl phenol ether and sobutyl p-hydroxybenzoate into the reaction vessel in sequence; and shearing and dispersing at 400 rpm for 10 minutes after sequential feeding is completed The following are specific examples in which same ingredients are selected in the specific preparation process, but mixed according to different amounts:

Embodiment 1

First, the saturated salt solution is injected into the electrolytic cell and the electrolysis operation is performed on the salt solution through the electrifying direct current (DC). And the generated gas is dried and collected. And then 20 parts of the iron filings and 500 parts of the hydrochloric acid are placed in the reaction vessel simultaneously. The generated gas is injected into the reaction vessel to react together with the iron filings and the hydrochloric acid so that mixing materials are formed. And the mixing materials are preheated by heat generated by the exothermic reaction between the iron filings and the hydrochloric acid. And then the catalyst is added into the reaction vessel and the oxygen is injected into the reaction vessel. The circulating pump is turned on to make the mixing materials circulate for 3-5 hours. 40 parts of the deionized water, 1 part of the monoglyceride stearate, 5 parts of the monolauryl phosphate, 5 parts of the polydimethylsiloxane, and 5 parts of methacrylate are added into the reaction vessel in sequence after the polymerization reaction is completed. And then the mixing materials are sheared and dispersed at 400 rpm for 30 minutes until the mixing materials are uniform. The reaction vessel is heated to 90 degrees, and 5 parts of the thermoplastic acrylic resin, 2 parts of the sodium dioctyl succinate sulfonate, and 2 parts of the sodium dodecyl benzene sulfonate are added into the reaction vessel in sequence. Then the mixing materials are sheared and dispersed at 400 rpm for 20 minutes until the mixing materials are uniform. Keeping shearing and dispersing the mixing materials at 400 rpm while 2 parts of the polyoxyethylene octyl phenol ether and 0.5 parts of the sobutyl p-hydroxybenzoate are added into the reaction vessel in sequence. And then, the mixing materials are sheared and dispersed at 400 rpm for 10 minutes after sequential feeding is completed.

Embodiment 2

First, the saturated salt solution is injected into the electrolytic cell and the electrolysis operation is performed on the salt solution through the electrifying direct current (DC). And the generated gas is dried and collected. And then 25 parts of the iron filings and 750 parts of the hydrochloric acid are placed in the reaction vessel simultaneously. The generated gas is injected into the reaction vessel to react together with the iron filings and the hydrochloric acid so that mixing material are formed. And the mixing materials are preheated by heat generated by the exothermic reaction between the iron filings and the hydrochloric acid. And then the catalyst is added into the reaction vessel and the oxygen is injected into the reaction vessel. The circulating pump is turned on to make the mixing materials circulate for 3-5 hours. 45 parts of the deionized water, 1.5 parts of the monoglyceride stearate, 7.5 parts of the monolauryl phosphate, 7.5 parts of the polydimethylsiloxane, and 7.5 parts of methacrylate are added into the reaction vessel in sequence after the polymerization reaction is completed. And then the mixing materials are sheared and dispersed at 400 rpm for 30 minutes until the mixing material are uniform. The reaction vessel is heated to 90 degrees, and 7.5 parts of the thermoplastic acrylic resin, 3.5 parts of the sodium dioctyl succinate sulfonate, and 3.5 parts of the sodium dodecyl benzene sulfonate are added into the reaction vessel in sequence. Then the mixing materials are sheared and dispersed at 400 rpm for 20 minutes until the mixing materials are uniform. Keeping shearing and dispersing the mixing materials at 400 rpm while 5.5 parts of the polyoxyethylene octyl phenol ether and 0.75 parts of the sobutyl p-hydroxybenzoate are added into the reaction vessel in sequence. And then, the mixing materials are sheared and dispersed at 400 rpm for 10 minutes after sequential feeding is completed.

Embodiment 3

First, the saturated salt solution is injected into the electrolytic cell and the electrolysis operation is performed on the salt solution through the electrifying direct current (DC). And the generated gas is dried and collected. And then 30 parts of the iron filings and 1000 parts of the hydrochloric acid are placed in the reaction vessel simultaneously. The generated gas is injected into the reaction vessel to react together with the iron filings and the hydrochloric acid so that mixing materials are formed. And the mixing materials are preheated by heat generated by the exothermic reaction between the iron filings and the hydrochloric acid. And then the catalyst is added into the reaction vessel and the oxygen is injected into the reaction vessel. The circulating pump is turned on to make the mixing materials circulate for 3-5 hours. 50 parts of the deionized water, 2 parts of the monoglyceride stearate, 10 parts of the monolauryl phosphate, 10 parts of the polydimethylsiloxane, and 10 parts of methacrylate are added into the reaction vessel in sequence after the polymerization reaction is completed. And then the mixing materials are sheared and dispersed at 400 rpm for 30 minutes until the mixing materials are uniform. The reaction vessel is heated to 90 degrees, and 10 parts of the thermoplastic acrylic resin, 5 parts of the sodium dioctyl succinate sulfonate, and 5 parts of the sodium dodecyl benzene sulfonate are added into the reaction vessel in sequence. Then the mixing materials are sheared and dispersed at 400 rpm for 20 minutes until the mixing materials are uniform. Keeping shearing and dispersing the mixing materials at 400 rpm while 8 parts of the polyoxyethylene octyl phenol ether and 1 part of the sobutyl p-hydroxybenzoate are added into the reaction vessel in sequence. And then, the mixing materials are sheared and dispersed at 400 rpm for 10 minutes after sequential feeding is completed.

After paintings on wooden or bamboo products by the ink composition of the present disclosure, a hot air gun is used to blow the painting on the wooden or bamboo products for 1-2 minutes to fix the painting on a substrate. The painting is resistant to water, sunlight and ultraviolet rays, so that a permanent preservation effect of the handicraft is achieved. The ink composition of the present disclosure is able to replace pyrographic tools, which not only has low cost, but also makes the pyrographic simple, such that inspirations of an artist are easily realized.

The above are only the preferred embodiments of the present disclosure, but the scope of the present disclosure is not limited to this. Any equivalent replacement or change by a person skilled in the art in accordance with the technical solution of the present disclosure within the technical scope disclosed by the present disclosure should be covered by the protection scope of the present disclosure.

What is claimed is:

1. An ink composition comprising following compositions in parts by weight
    salt solution in an amount ranging from 500-1000 parts;
    iron filings in an amount ranging from 20-30 parts;
    hydrogen chloride in an amount ranging from 2-5 parts;
    deionized water in an amount ranging from 40-50 parts;
    monoglyceride stearate in an amount ranging from 1-2 parts;
    monolauryl phosphate in an amount ranging from 5-10 parts;
    polydimethylsiloxane in an amount ranging from 5-10 parts;
    methacrylate in an amount ranging from 5-10 parts;
    thermoplastic acrylic resin in an amount ranging from 5-10 parts;
    sodium dioctyl succinate sulfonate in an amount ranging from 2-5 parts;
    sodium dodecyl benzene sulfonate in an amount ranging from 2-5 parts;
    polyoxyethylene octyl phenol ether in an amount ranging from 3-8 parts; and
    isobutyl p-hydroxybenzoate in an amount ranging from 0.5-1 parts.

2. The ink composition according to claim 1, wherein the ink comprises the following compositions in parts by weight:
    the salt solution in an amount of 500 parts;
    the iron filings in an amount of 20 parts;
    the hydrogen chloride in an amount of 2 parts;
    the deionized water in an amount of 40 parts;
    the monoglyceride stearate in an amount of 1 part;
    the monolauryl phosphate in an amount of 5 parts;
    the polydimethylsiloxane in an amount of 5 parts;
    the methacrylate in an amount of 5 parts;
    the thermoplastic acrylic resin in an amount of 5 parts;
    the sodium dioctyl succinate sulfonate in an amount of 2 parts;
    the sodium dodecyl benzene sulfonate in an amount of 2 parts;
    the polyoxyethylene octyl phenol ether in an amount of 3 parts; and
    the isobutyl p-hydroxybenzoate in an amount of 0.5 parts.

3. The ink composition according to claim 1, wherein the ink comprises the following compositions in parts by weight:
    the salt solution in an amount of 700 parts;
    the iron filings in an amount of 25 parts;
    the hydrogen chloride in an amount of 3.5 parts;
    the deionized water in an amount of 45 parts;

the monoglyceride stearate in an amount of 1.5 part;
the monolauryl phosphate in an amount of 7.5 parts;
the polydimethylsiloxane in an amount of 7.5 parts;
the methacrylate in an amount of 7.5 parts;
the thermoplastic acrylic resin in an amount of 7.5 parts;
the sodium dioctyl succinate sulfonate in an amount of 3.5 parts;
the sodium dodecyl benzene sulfonate in an amount of 3.5 parts;
the polyoxyethylene octyl phenol ether in an amount of 5.5 parts; and
the isobutyl p-hydroxybenzoate in an amount of 0.75 parts.

4. The ink composition according to claim 1, wherein the ink comprises the following compositions in parts by weight:
the salt solution in an amount of 1000 parts;
the iron filings in an amount of 30 parts;
the hydrogen chloride in an amount of 5 parts;
the deionized water in an amount of 50 parts;
the monoglyceride stearate in an amount of 2 parts;
the monolauryl phosphate in an amount of 10 parts;
the polydimethylsiloxane in an amount of 10 parts;
the methacrylate in an amount of 10 parts;
the thermoplastic acrylic resin in an amount of 10 parts;
the sodium dioctyl succinate sulfonate in an amount of 5 parts;
the sodium dodecyl benzene sulfonate in an amount of 5 parts;
the polyoxyethylene octyl phenol ether in an amount of 8 parts; and
the isobutyl p-hydroxybenzoate in an amount of 1 part.

\* \* \* \* \*